United States Patent
Rivers et al.

(10) Patent No.: US 7,696,393 B2
(45) Date of Patent: Apr. 13, 2010

(54) METHOD AND COMPOSITIONS FOR INHIBITING FORMATION OF HYDROCARBON HYDRATES

(75) Inventors: Gordon Thomas Rivers, Houston, TX (US); Daniel Lee Crosby, Sugar Land, TX (US)

(73) Assignee: Shell Oil Company, Houston, TX (US)

( * ) Notice: Subject to any disclaimer, the term of this patent is extended or adjusted under 35 U.S.C. 154(b) by 1148 days.

(21) Appl. No.: 10/526,298

(22) PCT Filed: Sep. 3, 2003

(86) PCT No.: PCT/EP03/09829

§ 371 (c)(1),
(2), (4) Date: Oct. 13, 2005

(87) PCT Pub. No.: WO2004/022909

PCT Pub. Date: Mar. 18, 2004

(65) Prior Publication Data

US 2006/0106265 A1    May 18, 2006

Related U.S. Application Data

(60) Provisional application No. 60/407,753, filed on Sep. 3, 2002.

(51) Int. Cl.
C07C 9/00 (2006.01)
(52) U.S. Cl. .................. 585/15; 210/696; 210/697; 210/698; 210/749
(58) Field of Classification Search ......... 210/696–698, 210/749; 585/15
See application file for complete search history.

(56) References Cited

U.S. PATENT DOCUMENTS

| | | | |
|---|---|---|---|
| 3,244,188 A | 4/1966 | Parks et al. | 137/15 |
| RE4,394 E | 5/1971 | Waters | |
| 3,578,421 A | 5/1971 | Andress, Jr. et al. | 44/62 |
| 3,965,027 A | 6/1976 | Boffardi et al. | 252/180 |
| 4,018,702 A | 4/1977 | Boffardi et al. | 252/389 |
| 5,583,273 A | 12/1996 | Colle et al. | 585/15 |
| 5,648,575 A | 7/1997 | Klomp et al. | 585/15 |
| 5,879,561 A | 3/1999 | Klomp et al. | 210/698 |
| 5,900,516 A | 5/1999 | Talley et al. | 585/15 |
| 5,998,565 A | 12/1999 | de Brabander-van den Berg et al. | 528/176 |
| 6,369,004 B1 | 4/2002 | Klug et al. | 507/90 |
| 6,544,392 B1 | 4/2003 | Downes | 204/242 |
| 2003/0057158 A1 | 3/2003 | Klomp | 210/698 |

FOREIGN PATENT DOCUMENTS

| | | |
|---|---|---|
| EP | 0736130 | 10/1996 |
| EP | 0824631 | 2/1998 |
| NL | 9200043 | 8/1993 |
| WO | 88/01180 | 2/1988 |
| WO | 93/14147 | 7/1993 |
| WO | 93/25798 | 12/1993 |
| WO | 96/08673 | 3/1996 |
| WO | 97/19987 | 6/1997 |
| WO | 98/05745 | 2/1998 |
| WO | 99/13197 | 3/1999 |
| WO | 99/16810 | 4/1999 |
| WO | 00/56804 | 9/2000 |
| WO | 00/58388 | 10/2000 |
| WO | 01/77270 | 10/2001 |

OTHER PUBLICATIONS

Seiler, M. et al (2003). "Hyperbranched polymers: new selective solvents for extractive distillation and solvent extraction." Separation and Purification Technology, 30, 179-197.*

* cited by examiner

Primary Examiner—Glenn A Caldarola
Assistant Examiner—Brian McCaig
(74) Attorney, Agent, or Firm—William E. Hickman

(57) ABSTRACT

A method for inhibiting formation of hydrocarbon hydrates in mixtures of water and a hydrate-forming guest molecule has been discovered that involves adding a composition to the mixtures in an amount that is effective in inhibiting formation of the hydrocarbon hydrates under conditions otherwise effective to form the hydrocarbon hydrates in the absence of the reaction product. The composition includes at least one dendrimeric compound having a number average molecular weight of at least 1,000 atomic mass units (amu); and at least one small molecular weight species having less than 1,000 amu, selected from the group consisting of polyalkyleneimine, polyallylamine, starch, sugars, and polymers or copolymers of vinyl alcohol or allyl alcohol; and, optionally, at least one surfactant.

18 Claims, No Drawings

METHOD AND COMPOSITIONS FOR INHIBITING FORMATION OF HYDROCARBON HYDRATES

The present application is a 35 U.S.C. 371 national stage filing of PCT/EP2003/009829 filed Sep. 3, 2003 claiming priority of U.S. provisional application 60/407,753 filed Sep. 3, 2002, hereby incorporated by reference.

FIELD OF THE INVENTION

The invention relates to methods and compositions for inhibiting the formation of hydrocarbon hydrates, and most particularly relates, in one non-limiting embodiment, to methods and compositions for inhibiting the formation of hydrocarbon hydrates during the production of oil and gas, where the compositions have more than one component.

BACKGROUND OF THE INVENTION

A number of hydrocarbons, especially lower-boiling light hydrocarbons, in formation fluids or natural gas are known to form hydrates in conjunction with the water present in the system under a variety of conditions—particularly at a combination of lower temperature and higher pressure. The hydrates usually exist in solid forms that are essentially insoluble in the fluid itself. As a result, any solids in a formation or natural gas fluid are at least a nuisance for production, handling and transport of the same. It is not uncommon for hydrate solids (or crystals) to cause plugging and/or blockage of pipelines or transfer lines or other conduits, valves and/or safety devices and/or other equipment, resulting in shutdown, loss of production and risk of explosion or unintended release of hydrocarbons into the environment either on-land or offshore. Accordingly, hydrocarbon hydrates have been of substantial interest as well as concern to many industries, particularly the petroleum and natural gas industries.

Hydrocarbon hydrates are clathrates, and are also referred to as inclusion compounds. Clathrates are cage structures formed between a host molecule and a guest molecule. A hydrocarbon hydrate generally is composed of crystals formed by water host molecules surrounding the hydrocarbon guest molecules. The smaller or lower-boiling hydrocarbon molecules, particularly $C_1$ (methane) to $C_4$ hydrocarbons and their mixtures, are more problematic because it is believed that their hydrate or clathrate crystals are easier to form. For instance, it is possible for ethane to form hydrates at as high as 4° C. at a pressure of about 1 MPa. If the pressure is about 3 MPa, ethane hydrates can form at as high a temperature as 14° C. Even certain non-hydrocarbons such as carbon dioxide, nitrogen and hydrogen sulphide are known to form hydrates under the proper conditions.

There are two broad techniques to overcome or control the hydrocarbon hydrate problems, namely thermodynamic and kinetic. For the thermodynamic approach, there are a number of reported or attempted methods, including water removal, increasing temperature, decreasing pressure, addition of "antifreeze" to the fluid and/or a combination of these. Thermodynamic techniques function by shifting the hydrate formation equilibrium to a point outside the hydrate-forming conditions exhibited in the fluid. Kinetic inhibitors operate within hydrate equilibrium conditions. The kinetic approach generally attempts (a) to prevent the smaller hydrocarbon hydrate crystals from agglomerating into larger ones; (b) to inhibit the hydrocarbon hydrates from being formed in the first place; (c) to slow down crystal formation or growth under a particular set of conditions; and/or a combination of these approaches.

Kinetic efforts to control hydrates have included use of different materials as inhibitors. For instance, the use of compounds normally referred to as "quats" has been described in, inter alia, EP-A-736130, EP-A-824631, U.S. Pat. No. 5,648, 575 and WO-A 98/05745. The "quat" type compounds focus around quaternary onium, in particular quaternary ammonium, compounds containing two or three lower alkyl chains, preferably containing $C_4$ and/or $C_5$ alkyl groups and one or two longer alkyl chains, preferably containing at least eight carbon atoms, which are bound to the central nitrogen moiety, thus forming a cationic species which is matched by a suitable anion such as a halide or other inorganic anion. Preferred "quats" comprise two long chains, comprising between 8 and 50 carbon atoms, which may also contain ester groups and/or branched structures. Additives such as polymers with lactam rings have also been employed to control clathrate hydrates in fluid systems. These kinetic inhibitors are commonly labelled Low Dosage Hydrate Inhibitors (LDHI) in the art.

WO 01/77270 discloses the use of dendrimeric compounds as hydrate inhibitors. Dendrimeric compounds are in essence three-dimensional, highly branched oligomeric or polymeric molecules comprising a core, a number of branching generations and an external surface composed of end groups. A branching generation is composed of structural units that are bound radially to the core or to the structural units of a previous generation and which extend outwards. The structural units have at least two reactive monofunctional groups and/or at least one monofunctional group and one multifunctional group. The term multifunctional is understood as having a functionality of 2 or higher.

An object of the invention is to provide an improved method for inhibiting gas hydrate formation in mixtures of hydrate-forming guest molecules and water where hydrates would otherwise form to a greater extent in absence of the method.

Another object of the invention is to provide gas hydrate inhibitor compositions and/or hydrate inhibitor synergists that are readily produced.

Therefore, the present invention provides a method for inhibiting formation of hydrocarbon hydrates in a mixture comprising water and hydrate-forming guest molecules, the method comprising contacting the mixture with a composition which comprises at least one dendrimeric compound effective to inhibit formation and/or agglomeration of hydrates in the mixture having a number average molecular weight of at least 1,000 atomic mass units (amu); and at least one small molecular weight species having a molecular weight of less than 1,000 amu, selected from the group consisting of polyalkyleneimine, polyallylamine, starch, sugars, and polymers or copolymers of vinyl alcohol or allyl alcohol, where the composition amount is effective in inhibiting formation of the hydrocarbon hydrates in the mixture. The method may involve contacting the mixture with the composition under conditions effective to form the hydrocarbon hydrates in the absence of the composition. The composition amount is effective in inhibiting formation of the hydrocarbon hydrates in the mixture.

DETAILED DESCRIPTION OF THE INVENTION

In another aspect, the invention includes hydrate-inhibited mixtures containing compositions as described above. Additionally, the invention provides compositions having at least one dendrimeric compound having a number average molecular weight of at least 1,000 atomic mass units (amu), and at least one small molecular weight species having a molecular weight less than 1,000 amu.

In the present invention there are included methods and compositions used therein for inhibiting, retarding, mitigating, reducing, controlling and/or delaying formation of hydrocarbon hydrates or agglomerates of hydrates. The method may be applied to prevent or reduce or mitigate plugging of conduits, pipes, transfer lines, valves, and other places or equipment where hydrocarbon hydrate solids may form under conditions conducive to their formation or agglomeration. In one aspect of the invention, unexpected, synergistic results in inhibiting hydrate formation may be obtained.

The term "inhibiting" is used herein in a broad and general sense to mean any improvement in preventing, controlling, delaying, reducing or mitigating the formation, growth and/or agglomeration of hydrocarbon hydrates, particularly light hydrocarbon gas hydrates in any manner, including, but not limited to kinetically, thermodynamically, by dissolution, by breaking up, other mechanisms, or any combination thereof. Although the term "inhibiting" is not intended to be restricted to the complete cessation of gas hydrate formation, it may include the possibility that formation and/or agglomeration of any gas hydrate is entirely prevented.

The terms "formation" or "forming" relating to hydrates are used herein in a broad and general manner to include, but are not limited to, any formation of hydrate solids from water and hydrocarbon(s) or hydrocarbon and non-hydrocarbon gas(es), growth of hydrate solids, agglomeration of hydrates, accumulation of hydrates on surfaces, any deterioration of hydrate solids plugging or other problems in a system and combinations thereof.

In brief, the invention concerns a methodology of controlling (i.e. preventing, retarding, and/or anti-agglomeration) gas hydrates to facilitate fluid transportation and handling. In one non-limiting embodiment of the invention, a tri-functional gas hydrate inhibitor formulation is involved. This formulation is a blend of at least one large molecular weight dendrimeric compound having a molecular weight of 1,000 amu or greater, combined with at least one small molecular weight species having a molecular weight less than 1,000 amu, with at least one surfactant. It is believed that the large and small molecular weight components act as hydrate crystal nucleation and/or crystal growth inhibitors while the surfactant is a solvating and/or surface tension modifier. Collectively, the three components act synergistically to control hydrate formation.

The present method is useful for inhibiting hydrate formation for many hydrocarbons and hydrocarbon and/or non-hydrocarbon mixtures. The method is particularly useful for lighter or low-boiling, $C_1$-$C_5$ hydrocarbon gases, non-hydrocarbon gases or gas mixtures at ambient conditions. Examples of such gases ("hydrate-forming guest molecules") include methane, ethane, ethylene, acetylene, propane, propylene, methylacetylene, n-butane, isobutane, 1-butene, trans-2-butene, cis-2-butene, isobutene, butene mixtures, isopentane, pentenes, natural gas, carbon dioxide, hydrogen sulphide, nitrogen, oxygen, argon, krypton, xenon, and mixtures thereof. Other examples include various natural gas mixtures that are present in many gas and/or oil formations and natural gas liquids (NGL). The hydrates of all of these low-boiling hydrocarbons are also referred to as gas hydrates. The hydrocarbons may also comprise other compounds including, but not limited to CO, $CO_2$, COS, hydrogen, hydrogen sulphide ($H_2S$), and other compounds commonly found in gas/oil formations or processing plants, either naturally occurring or used in recovering/processing hydrocarbons from the formation or both, and mixtures thereof.

When an effective amount is used, hydrocarbon hydrate formation is inhibited under conditions where such hydrate formation is not otherwise inhibited in the absence of such effective amount. After the contacting and after the conditions no longer favour formation of gas hydrates, the method may further comprise, optionally, removing the composition, individual or certain components of the composition or other compounds or mixtures in the composition or the mixture comprising water and the hydrate-forming guest molecules.

The large molecular weight dendrimeric compound of the present inventive composition preferably involves branched and crosslinked polymers having at least one acyclic or cyclic pendant group containing from 3 to 7 carbon atoms, as well as these branched and crosslinked polymers containing at least one N, O, and/or S heteroatom. More specific examples of dendrimeric compounds include, but are not necessarily limited to, ASTRAMOL poly(propylene imine) dendrimers, available from DSM. The ASTRAMOL dendrimers, presented for the first time in 1993, are synthesized via the reaction scheme of a repetitive reaction sequence involving a Michael addition of two equivalents of acrylonitrile to a primary amine group, followed by hydrogenation of the nitrile groups to primary amine groups. Diaminobutane (DAB) is used as the core molecule. Each complete reaction sequence results in a new "generation" with a larger diameter and twice the number of reactive functional end groups. This class of poly(propylene imine) dendrimers has been described in, i.a., WO-A-93/14147.

Suitable dendrimeric compounds include HYBRANE hyperbranched polyesteramides obtainable from DSM. The preparation of such compounds has been described in more detail in International Patent Application Nos. WO-A-99/16810, WO-A-00/58388 and WO-A-00/56804. Accordingly, the dendrimeric compound is preferably a condensation polymer containing ester groups and at least one amide group in the backbone, having at least one hydroxyalkylamide end group and having a number average molecular weight of at least 1000 amu. This class of polymers has a lower degree of branching than the poly(propylene imine) dendrimers described in WO-A-93/14147, but still retains the non-linear shape and the high number of reactive end groups which are characteristic of dendrimeric compounds. Compounds belonging to this class of dendrimers are suitably produced by reacting a cyclic anhydride with an alkanolamine giving rise to dendrimeric compounds by allowing them to undergo a number of (self)condensation reactions leading to a predetermined level of branching. More information about the structure of HYBRANE dendrimeric compounds is described in WO-A-01/77270 and the references therein.

Accordingly, the alkanolamine may be a dialkanolamine, a trialkanolamine or a mixture thereof. Examples of suitable dialkanolamines are 3-amino-1,2-propanediol, 2-amino-1,3-propanediol, diethanolamine bis(2-hydroxy-1-butyl)amine, dicyclohexanolamine and diisopropanolamine. Diisopropanolamine is particularly preferred. As an example of a suitable trialkanolamine reference is made to tris(hydroxymethyl)aminomethane or triethanolamine.

Suitable cyclic anhydrides comprise succinic anhydride, glutaric anhydride, tetrahydrophthalic anhydride, hexahydrophthalic anhydride, phthalic anhydride, norbornene-2,3-dicarboxylic anhydride, naphthalenic dicarboxylic anhydride. The cyclic anhydrides may contain substituents, in particular hydrocarbon (alkyl or alkenyl) substituents. The substituents suitably comprise from 1 to 15 carbon atoms. Suitable examples include 4-methylphthalic anhydride, 4-methyltetrahydro- or 4-methylhexahydrophthalic anhydride, methyl succinic anhydride, poly(isobutyl)-succinic anhydride and 2-dodecenyl succinic anhydride. Mixtures of anhydrides can also be used. The (self-)condensation reaction is suitably carried out without a catalyst at temperatures between 100 and 200° C. By carrying out such (self-)condensation reactions compounds will be obtained having amide-type nitrogen moieties as branching points and with hydroxyl end groups in the base polymer. Depending on the reaction conditions, predetermined molecular weight ranges and number of end groups can be set. For instance, using hexahydrophthalic anhydride and diisopropanolamine polymers can be produced having a number average molecular weight tuned between 1000 and 50,000, preferably between 1200 and 10,000, more preferably between 1200 and 5000. The number of hydroxyl groups per molecule in such case is suitably in the range between 0 and 13.

The functional end groups (hydroxyl groups) of the polycondensation products can be modified by further reactions as disclosed in the above-mentioned applications WO-A-00/58388 and WO-A-00/56804. Suitable modification can take place by reaction of at least part of the hydroxyl end groups with fatty acids, such as lauric acid or coco fatty acid. Another type of modification can be obtained by partial replacement of the alkanolamine by other amines, such as secondary amines, e.g., N,N-bis-(3-dimethylaminopropyl)amine, morpholine or non-substituted or alkyl-substituted piperazine, in particular N-methyl piperazine. The use of N,N-bis-(dialkylaminoalkyl)amines results in dendrimeric polymers that have been modified to have tertiary amine end groups. In particular the products prepared by the polycondensation of 2-dodecenyl succinic anhydride or hexahydrophthalic anhydride with diisopropanolamine that have been modified by morpholine, tertiary amine or non-substituted or alkyl-substituted piperazine end groups are very suitable for use in the process of the present invention.

The small molecular weight species are polymers or non-polymers having less than 1,000 amu. They include polyalkyleneimines, polyallylamines, starch, sugars, and polymers and/or copolymers of vinyl alcohol or allyl alcohol. The small molecular weight species may also be modified to also contain at least one acyclic or cyclic pendant group containing from 3 to 7 carbon atoms. Also included are the above small molecular weight species containing N, O, and/or S heteroatom.

Modified polyalkyleneimines are known from, e.g., U.S. Pat. No. 5,583,273. This patent specification describes N-acyl modified polyalkyleneimines for use as hydrate inhibitors. Examples include N-acyl substituted polyethyleneimine, polypropylneimine, polybutyleneimine, polypentyleneimine and mixtures thereof. The preparation can be achieved via ring-opening reactions. The preferred small molecular weight species in the present invention is based on polyethyleneimine. The polyethyleneimine may contain one or more substituents on a nitrogen atom.

Suitable surfactants for use in the inventive compositions include, but are not necessarily limited to cationic, anionic or nonionic surfactants that may be polyoxyethylene ethers, sorbitans, long chain alcohols, sulphates, diols, fatty acids, alkylated ammonium, compounds, or sulphonium compounds and mixtures thereof. Preferably, the surfactant comprises a quaternary ammonium compound. Suitable examples of onium compounds have been described in EP-B-0 736 130. Preferably, the surfactant is a quaternary ammonium compound comprising four alkyl groups, at least one of which has 8 to twenty carbon atoms. The other alkyl groups have from 1 to 6 carbon atoms. Suitable specific surfactants include RE4136HIW, RE4154HIW and RE4394HIW sold by Baker Petrolite Corporation.

With respect to the proportions of the various components of the inventive composition, for any two unique large molecular weight dendrimeric compound and different small molecular weight species, there is an optimum molar ratio between the two. However, the optimum molar ratio is dependent upon a number of complex, interrelated factors and will vary. These factors include, but are not necessarily limited to, the nature of the components, the components in the fluid system being treated, the temperature and pressure in the fluid system being treated and the like. Nevertheless, in order to give some idea of component proportions that might be used, the composition may comprise from about 0.1 to about 2 wt %, based on water, of the at least one large molecular weight dendrimeric compound having at least 1,000 amu; from about 0.1 to about 2 wt % of the at least one small molecular weight species having less than 1,000 amu; and, where applicable, from about 10 to about 3000 ppm of the at least one surfactant. In a non-limiting, preferred embodiment of the invention, the composition comprises from about 0.5 to about 1 wt % of the at least one large molecular weight dendrimeric compound having at least 1,000 amu; from about 0.5 to about 1 wt % of the at least one small molecular weight species having less than 1,000 amu; and from about 50 to about 1000 ppm of the at least one surfactant. Although the concentration of surfactant may be as high as 2% by weight in the treated fluid it is preferred to apply the surfactant at relatively low concentrations, on the order of 0.1 wt % or less. The surfactant's applied concentration is also dependent on the composition of the fluid being treated and its conditions, and will vary accordingly.

The contacting may be achieved by a number of ways or techniques, including, but not necessarily limited to, mixing, blending with mechanical mixing equipment or devices, stationary mixing set-up or equipment, magnetic mixing or other suitable methods, other equipment and means known to one skilled in the art and combinations thereof to provide adequate contact and/or dispersion of the composition in the mixture. The contacting can be made in-line or offline or both. The various components of the composition may be mixed prior to or during contact, or both. As discussed, if needed or desired, the composition or some of its components may be optionally removed or separated mechanically, chemically, or by other methods known to one skilled in the art, or by a combination of these methods after the hydrate formation conditions are no longer present.

Because the present invention is particularly suitable for lower boiling hydrocarbons or hydrocarbon and/or non-hydrocarbon gases at ambient conditions with no more than five carbon atoms, the pressure of the hydrate-forming condition is usually at or greater than atmospheric pressure (i.e. greater than or equal to about 101 kPa), preferably greater than about 1 MPa, and more preferably greater than about 5 MPa. The pressure in certain formations or processing plants or units could be much higher, say greater than about 20 MPa. There is no specific high-pressure limit. The present method can be used at any pressure that allows formation of hydrocarbon gas hydrates.

The temperature of the condition for contacting is usually below, the same as, or not much higher than the ambient or room temperature. Lower temperatures tend to favour hydrate formation, thus requiring the treatment with the compositions of the present invention. At much higher temperatures, however, hydrocarbon hydrates may not form, thus obviating the need of carrying out any treatments.

It will be appreciated that the proportions effective in inhibiting hydrocarbon hydrate formations in any given situation may vary broadly. There are a number of complex, interrelated factors that can be taken into account in determining the effective dosage or proportion, including, but not necessarily limited to, the proportion of water in the hydrocarbon, the nature of the hydrocarbon, the temperature and pressure conditions that the mixture of hydrocarbon and water are subject to, the particular hydrocarbon hydrate inhibitor employed, etc. Nevertheless, in the interest of attempting to provide some general guidance of effective proportions, relative to the water phase, the amount of the composition is preferably less than about 3 wt %, preferably less than about 2 wt %, but is limited only by what is economically feasible. The lower limit is suitably 0.01 wt %, relative to the water phase.

The weight ratio of the large molecular weight dendrimeric compound and the low molecular weight molecular species may vary between broad ranges. Good results are obtainable if their weight ratio varies between 10:1 and 1:10. Preferably, their weight ratio is from 2:1 to 1:2.

In addition to the components of the inventive composition discussed above, the hydrocarbon inhibitor composition may further comprise other additional components, including, but not limited to, different controlling chemicals such as corrosion, wax, asphaltene and other hydrate inhibitors and/or solvents. These other chemicals should not conflict with the use of the hydrate formation-inhibiting compositions of the present invention. Suitable solvents include, but are not limited to water; at least one oxygenated compound selected from $C_1$-$C_6$ alcohols, $C_2$-$C_6$ glycols, $C_1$-$C_6$ mono-aliphatic, preferably mono-alkyl, ethers of $C_2$-$C_6$ glycol, glycerin, $C_1$-$C_6$ mono-aliphatic, particularly mono-alkyl, ethers of glycerol, $C_1$-$C_6$ di-aliphatic, particularly dialkyl, ethers of glycerol, glycerol esters of $C_1$-$C_6$ carboxylate; tetrahydrofuran; N-methylpyrrolidone; sulfolane; $C_3$-$C_{10}$ ketones, and mixtures thereof. Examples of preferred solvents include water and liquid oxygenated materials such as methanol, ethanol, propanol, glycols like ethylene glycol, 1,2-propylene glycol, 1,3-propylene glycol, glycerol, esters and ethers of glycerol, 2-ethoxyethanol, 2-ethoxyethanol derivatives, 2-methoxyethanol, ethoxylated propylene glycols, ketones such as cyclohexanone and diisobutylketone, and mixtures thereof. The solvent is present in the total hydrocarbon hydrate inhibiting composition in the range of from 0% to about 85%, preferably from about 0% to about 65%, of the total composition, based on volume.

Other suitable hydrate inhibitors that may be added to the composition of the present invention include those described in WO-A 93/25798 (poly vinyl pyrrolidone), or in the above-mentioned U.S. Pat. No. 5,583,273 (polyvinyl pyrrolidone, polyvinyl caprolactam, polyvinyl carboxylates, poly acrylates, poly acrylamide, large molecular weight polyethyleneimine derivatives) or a terpolymer of N-vinyl-pyrrolidone, N-vinylcaprolactam and dimethylaminoethyl methacrylic acid marketed by ISP Corporation as "GAFFIX", or the compounds normally referred to as "quats" that have been described in, inter alia, EP-A-736130, EP-A-824631, U.S. Pat. No. 5,648,575 and WO-A 98/05745.

Because some of the reaction products disclosed herein are solids under ambient conditions, it is often preferred to use a suitable solvent as described above in the composition. This allows the formation of a homogeneous or uniform solution, suspension, emulsion or a combination of these, of all the components for easier mixing or distributing or dispersing the composition in the hydrocarbon/water fluid or system to be treated. As a result, more efficient and/or favourable contacting of the composition with the mixture comprising water and the hydrate-forming guest molecules can be effected.

The present invention also may be used in combination with other methods or processes, which have been known to one skilled in the art as discussed in the background to help inhibit formation of hydrates.

Experimental Set-up

All testing is isochoric. This results in the cell pressure dropping as the cell temperature is ramped from 72° F. to 40° F. (22.2 to 4.4° C.). The starting pressure is about 1500 psig (10 MPa), the final cell pressure at 40° F. (4.4° C.), before hydrate formation, varies, and is dependent on the test fluids (composition, liquid hydrocarbon ratio, etc.) employed. Generally, the cell pressure drops to the 1200 to 1300 psig (8.3 to 9.0 MPa) range before hydrate formation.

Testing is performed with a bank of modified sight flow indicators, which serve as pressure vessel reactors. Each reactor or cell is isolated from its companions, and is independently pressurized and contains its own, independent pressure transducer. Up to six reactors constitute a bank of test cells. A test is performed by immersing a bank of test cells in a common temperature-controlled water bath.

Depending upon the experimental protocol, the water bath (and therefore the cells within) is gently rocked and/or held stationary at time intervals. Stationary intervals are designed to mimic pipeline shut-ins.

Other important procedural features include:
1. The bath water temperature and each pressure transducer are independently monitored and the data preserved by a computerized data acquisition system.
2. Each cell contains stainless steel ball(s) that provide agitation of the cell's contents when the water bath is rocked.
3. At least one cell in every test bank is a control, containing either a reference inhibitor or none at all.
4. Tests employ either the shock cool method wherein the cells are placed in pre-chilled water or are ramp cooled from near room temperature to some target low temperature.
5. All cells are dissembled and meticulously cleaned between each test.
6. Multiple repeats of a particular inhibitor blend are often made to provide a statistical sampling of a blend's performance.
7. Each cell has a window for visual observations.
8. Visual observations are made at irregular intervals to better ascertain the processes occurring within the cell and to confirm the results of the pressure data.

For the purpose of kinetic hydrate testing, the life and failure of a test blend is measured as the time expended before radical hydrate formation (induction time). This point is denoted by a drop in pressure that is independent of a pressure drop due to a change in temperature.

As Low Dosage Hydrate Inhibitor (LDHI) are used: HA 1690=a dendrimeric polyesteramide wherein the structural units are hexahydrophthalic anhydride, di-isopropanol amine and N,N-bis-(3-dimethylaminopropyl)amine, having a number-average molecular weight (Mn) of 1600; and RE4890=a modified 600 amu PEI (polyethyleneimine), available from Baker Petrolite Corporation. When a mixture was used of HA 1690 and RE 4890 they were applied in a weight ratio of 1:1.

As surfactant was used:
RE4394=an alkylated quaternary ammonium compound (surfactant) available from Baker Petrolite Corporation.

Tests were carried out using a synthetic natural gas blend containing methane, ethane, propane & carbon dioxide (1/5/5.4/88.6 mole % CO2/C2/C3/C1) and 80/20 vol % brine/black oil solution. The brine comprised 2.5% wt of salts and 10% wt methanol.

The results of multiple experiments validating this invention are presented in the following Table.

TABLE

| Ex. | Test Blend | LDHI approx. wt % | RE4394 approx. ppm as supplied | Induction Time (hr) |
|---|---|---|---|---|
| 1 | Blank | 0 | 0 | 11.7 |
| 2 | RE4890 | 1 | 0 | 13.0 |
| 3 | HA 1690 | 1 | 0 | 15.5 |
| 4 | HA1690 + RE4890 | 1 | 0 | 16.0 |
| 5 | HA1690 + RE4890 + RE4394 | 1 | 300 | 25.5 |
| 6 | HA1690 + RE4890 + RE4394 | 1 | 625 | 19.9 |
| 7 | HA1690 + RE4890 + RE4394 | 1 | 1250 | 18.4 |
| 8 | HA1690 + RE4890 + RE4394 | 1 | 4975 | 13.3 |
| 9 | HA1690 + RE4890 + RE4394 | 1 | 7450 | 14.5 |
| 10 | HA1690 + RE4890 + RE4394 | 1 | 9900 | 14.3 |

We claim:

1. A method for inhibiting formation of hydrocarbon hydrates in a mixture comprising water and hydrate-forming guest molecules, the method comprising
    contacting the mixture with a composition which comprises at least one dendrimeric compound having a number average molecular weight of at least 1,000 atomic mass units (amu); and
    at least one small molecular weight species having less than 1,000 amu, selected from the group consisting of polyalkyleneimine, polyallylamine, starch, sugars, and polymers or copolymers of vinyl alcohol or allyl alcohol, where the composition amount is effective in inhibiting formation of the hydrocarbon hydrates in the mixture.

2. The method of claim 1 where the dendrimeric compound is selected from the group consisting of branched and crosslinked polymers having at least one acyclic or cyclic pendant group containing from 3 to 7 carbon atoms, and said branched and crosslinked polymers also containing a heteroatom selected from the group consisting of nitrogen, oxygen, and sulfur, and mixtures thereof.

3. The method of claim 2, in which the dendrimeric compound is a condensation polymer containing ester groups and at least one amide group in the backbone, having at least one hydroxyalkylamide end group and having a number average molecular weight of at least 1000 amu.

4. The method of claim 1, in which the small molecular weight species comprises polyalkyleneimine.

5. The method of claim 1, in which the small molecular weight species comprises at least one acyclic or cyclic pendant group containing from 3 to 7 carbon atoms.

6. The method of claim 1, in which the composition comprises at least one surfactant.

7. The method of claim 6 where the surfactant comprises a cationic, anionic or nonionic surfactant selected from the group consisting of polyoxyethylene ethers, sorbitans, long chain alcohols, sulphates, diols, fatty acids, alkylated ammonium compounds, phosphonium compounds, sulphonium compounds and mixtures thereof.

8. The method of claim 6, in which the composition comprises:
    from 0.1 to 2 wt % of the at least one dendrimeric compound;
    from 0.1 to 2 wt % of the at least one small molecular weight species having less than 1,000 amu; and
    from about 10 to about 3000 ppm of at least one surfactant.

9. A composition for inhibiting formation of hydrocarbon hydrates which comprises at least one dendrimeric compound having a number average molecular weight of at least 1,000 atomic mass units; and at least one small molecular weight species having less than 1,000 atomic mass units, selected from the group consisting of polyalkyleneimine, polyallylamine, starch, sugars, and polymers or copolymers of vinyl alcohol or allyl alcohol.

10. The composition of claim 9 in which the dendrimeric compound is selected from the group consisting of branched and crosslinked polymers having at least one acyclic or cyclic pendant group containing from 3 to 7 carbon atoms, and said branched and crosslinked polymers comprising a heteroatom selected from the group consisting of nitrogen, oxygen, and sulfur, and mixtures thereof.

11. The composition of claim 10, in which the dendrimeric compound comprises a condensation polymer containing ester groups and at least one amide group in the backbone, having at least one hydroxyalkylamide end group, and having a number average molecular weight of at least 1000 atomic mass units.

12. The composition of claim 9, in which the small molecular weight species comprises polyalkyleneimine.

13. The composition of claim 9, in which the small molecular weight species comprises at least one acyclic or cyclic pendant group containing from 3 to 7 carbon atoms.

14. The composition of claim 9, in which the composition further comprises at least one surfactant.

15. The composition of claim 14, wherein the surfactant comprises a cationic, anionic or nonionic surfactant selected from the group consisting of polyoxyethylene ethers, sorbitans, long chain alcohols, sulphates, diols, fatty acids, quaternary ammonium compounds and mixtures thereof.

16. The composition of claim 9, in which the composition comprises:
    from 0.1 to 2 wt % of the at least one dendrimeric compound;
    from 0.1 to 2 wt % of the at least one small molecular weight species having less than 1,000 atomic mass units.

17. A hydrate inhibited mixture comprising:
    water;
    hydrate-forming guest molecules; and,
    a composition comprising:
    at least one dendrimeric compound having a number average molecular weight of at least 1,000 atomic mass units; and,
    at least one small molecular weight species having less than 1,000 atomic mass units, selected from the group consisting of polyalkyleneimine, polyallylamine, starch, sugars, and polymers or copolymers of vinyl alcohol or allyl alcohol;
    wherein the composition is present in a concentration effective to inhibit hydrate formation in the mixture.

18. The hydrate inhibited mixture of claim 17, in which the hydrate-forming guest molecules are selected from the group consisting of methane, ethane, ethylene, acetylene, propane, propylene, methylacetylene, n-butane, isobutane, 1-butene, trans-2-butene, cis-2-butene, isobutene, butene mixtures, isopentane, pentenes, natural gas, carbon dioxide, hydrogen sulphide, nitrogen, oxygen, argon, krypton, xenon, and mixtures thereof.

* * * * *